US010107144B2

United States Patent
Araki et al.

(10) Patent No.: US 10,107,144 B2
(45) Date of Patent: Oct. 23, 2018

(54) THERMAL POWER PLANT FOR RECOVERING WATER FROM EXHAUST GAS AND A METHOD FOR TREATING RECOVERED WATER OF THERMAL POWER PLANT THEREOF

(71) Applicant: Mitsubishi Hitachi Power Systems, Ltd., Nishi-ku, Yokohama (JP)

(72) Inventors: Hidefumi Araki, Yokohama (JP); Kazuhiko Sato, Yokohama (JP); Yasushi Iwai, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 211 days.

(21) Appl. No.: 15/198,302

(22) Filed: Jun. 30, 2016

(65) Prior Publication Data

US 2017/0002694 A1    Jan. 5, 2017

(30) Foreign Application Priority Data

Jul. 2, 2015    (JP) ................................ 2015-133194

(51) Int. Cl.
    *F02C 3/30*      (2006.01)
    *F02C 6/18*      (2006.01)
    (Continued)

(52) U.S. Cl.
    CPC .............. *F01K 23/10* (2013.01); *C02F 1/008* (2013.01); *C02F 1/20* (2013.01); *C02F 1/42* (2013.01);
    (Continued)

(58) Field of Classification Search
    CPC ........ F01K 23/10; F01K 11/02; F01K 21/047; F02C 3/305; F02C 6/18; C02F 1/42;
    (Continued)

(56) References Cited

U.S. PATENT DOCUMENTS 6,343,570 B1 *    2/2002    Schmid ................. F01K 23/106
                                                                      122/7 R
2006/0107646 A1    5/2006    Hatamiya et al.
                          (Continued)

FOREIGN PATENT DOCUMENTS

| JP | 2000-54854 A | 2/2000 |
|----|---|---|
| JP | 2006-112282 A | 4/2006 |
| JP | 2009-162100 A | 7/2009 |

OTHER PUBLICATIONS

Extended European Search Report issued in counterpart European Application No. 16177288.4 dated Nov. 2, 2016 (Seven (7) pages).
(Continued)

*Primary Examiner* — William H Rodriguez
(74) *Attorney, Agent, or Firm* — Crowell & Moring LLP (57) ABSTRACT

A thermal power plant for recovering water from exhaust gas includes a gas turbine, a heat recovery steam generator for generating steam by supplying exhaust combustion gas exhausted from the gas turbine as heat source, a water recovery system installed on the downstream side of the heat recovery steam generator, a recovered water system for supplying a part of the water recovered by the water recovery system, allowing the water to be circulating as circulating water, a feed water system for supplying the heat recovery steam generator with other part of the water recovered by the water recovery system as feed water, pH adjusting systems, and a control system for controlling the volumes of pH adjusters supplied from the first and second pH adjusting systems.

15 Claims, 2 Drawing Sheets

(51) Int. Cl.
| | |
|---|---|
| *F01K 23/10* | (2006.01) |
| *F01K 21/04* | (2006.01) |
| *C02F 1/00* | (2006.01) |
| *C02F 1/20* | (2006.01) |
| *C02F 1/42* | (2006.01) |
| *C02F 1/44* | (2006.01) |
| *C02F 1/66* | (2006.01) |
| *C02F 9/00* | (2006.01) |
| *F01K 11/02* | (2006.01) |
| *C02F 103/34* | (2006.01) |

(52) U.S. Cl.
CPC ............... *C02F 1/441* (2013.01); *C02F 1/66* (2013.01); *C02F 9/00* (2013.01); *F01K 11/02* (2013.01); *F01K 21/047* (2013.01); *F02C 3/305* (2013.01); *C02F 2103/34* (2013.01); *C02F 2209/06* (2013.01); *F02C 6/18* (2013.01)

(58) Field of Classification Search
CPC .. C02F 1/441; C02F 1/166; C02F 9/00; C02F 2209/06; Y02E 20/16; F22B 1/1815
See application file for complete search history.

(56) References Cited

U.S. PATENT DOCUMENTS

| | | | |
|---|---|---|---|
| 2010/0229566 A1 | 9/2010 | Takahashi et al. | |
| 2010/0269482 A1 | 10/2010 | Hirota et al. | |
| 2014/0366549 A1* | 12/2014 | Wang | F02C 3/30 60/772 |
| 2015/0226090 A1* | 8/2015 | Schmid | B01D 19/0036 60/772 |
| 2015/0377078 A1* | 12/2015 | Anai | F22B 1/1815 60/39.182 |
| 2016/0215656 A1* | 7/2016 | Yagita | F02G 5/04 |
| 2017/0268383 A1* | 9/2017 | Hirayama | F01K 11/02 |

OTHER PUBLICATIONS

Lupandin, V. et al., "Design, Development and Testing of a Gas Turbine Steam Injection and Water Recovery System", Proceedings of ASME Turbo Expo 2001, Jun. 4-7, 2001, New Orleans, Louisiana, 2001-GT-0111 (Seven (7) pages).

Movchan, S. et al., "Contact Steam-and-Gas Turbine Units of the "Aquarius" Type", Proceedings of ASME Turbo Expo 2009: Power for Land, Sea and Air GT 2009, Jun. 8-12, 2009, Orlando, Florida, GT2009-60339 (Seven (7) pages).

* cited by examiner

THERMAL POWER PLANT FOR RECOVERING WATER FROM EXHAUST GAS AND A METHOD FOR TREATING RECOVERED WATER OF THERMAL POWER PLANT THEREOF

CLAIM OR PRIORITY

The present application claims priority from Japanese patent application JP 2015-133194 filed on Jul. 2, 2015, the content of which is hereby incorporated by reference into this application.

TECHNICAL FIELD

The present invention relates to a thermal power plant for recovering and reusing the water contained in exhaust combustion gas, particularly to a thermal power plant provided with a steam injected gas turbine for injecting steam to combustion air, for recovering water from exhaust combustion gas to be reused as feed water for a heat recovery steam generator through recovery of water from exhaust combustion gas, and a method for treating recovered water of a thermal power plant.

BACKGROUND ART

A humid air gas turbine system designed to increase the turbine output by injecting steam to a gas turbine combustor, increasing the flow rate of the combustion gas flowing into a turbine and increasing the specific heat of combustion gas is found in the techniques disclosed in the Japanese Patent Laid-Open No. 2000-054854 (Patent Literature 1) and Vladimir V. Lupandin, et al., DESIGN, DEVELOPMENT AND TESTING OF A GAS TURBINE STEAM INJECTION AND WATER RECOVERY SYSTEM, Proceedings of ASME TURBO EXPO 2001, 2001-GT-0111 (2001) (Non Patent Literature 1).

The percentage of make-up water required to inject steam is several percent through about ten percent of the air intake mass flow rate of a gas turbine. Since this figure is greater than that of the normal thermal power generation system, a problem has been raised in preparing make-up water.

The aforementioned Patent Literature 1 discloses a water recovery system for recovering wherein the exhaust gas exhausted from the heat recovery steam generator for generating steam using exhaust gas from a gas turbine as a heat source is led to a condenser and the exhaust gas is dehumidified, whereby condensate is separated from the exhaust gas and is recovered as recovered water.

The water recovered by the aforementioned water recovery system is subjected to a process of removing mixtures by means of a dust filter and a deaerator, as well as an ion exchange apparatus wherever required. After that, the treated water is fed to the aforementioned heat recovery steam generator, as disclosed in the Literature.

The aforementioned Non Patent Literature 1 also disclosed a water recovery system wherein exhaust gas exhausted from a heat recovery steam generator is cooled and condensed. After the gas dissolved in this recovered water has been separated and removed by a deaerator, the recovered water is fed to a heat recovery steam generator, as disclosed in the Literature.

According to the aforementioned Non Patent Literature 1, concentration of dissolved oxygen in the recovered water meets the requirements for the water fed to a boiler, and the adverse effect of such impurities as nitrogen dioxide, sodium ion, magnesium ion, calcium ion, iron ion and copper ion can be ignored, as described in the Literature.

Further, the Japanese Patent Laid-open No. 2009-162100 (Patent Literature 2) discloses a system wherein the water recovered from the exhaust gas of an advanced humid air gas turbine is supplied to a humidifier of compressed air and is reused. The recovered water partially extracted from this humidifier is purified and is supplied to the water recovery system.

The technique described in this Patent Literature 2 is provided with a water purification system to reduce the concentration of impurities, not to adjust the value of recovered water. Further, Patent Literature 2 also discloses that the carbon dioxide and nitrogen oxides included in the exhaust gas are absorbed in the recovered water of the water recovery system, with the result that recovered water turns acid.

CITATION LIST

Patent Literature

{Patent Literature 1}
Japanese Patent Laid-Open No. 2000-054854
{Patent Literature 2}
Japanese Patent Laid-open No. 2009-162100

Non Patent Literature

{Non Patent Literature 1} Vladimir V. Lupandin et al., DESIGN, DEVELOPMENT AND TESTING OF A GAS TURBINE STEAM INJECTION AND WATER RECOVERY SYSTEM, Proceedings of ASME TURBO EXPO 2001, 2001-GT-0111 (2001)

SUMMARY OF INVENTION

Technical Problem

Patent Literature 1 and Non Patent Literature 1 do not disclose the steam pressure of a heat recovery steam generator. When the steam pressure of a heat recovery steam generator is increased, the requirements for the quality of water supplied to a boiler will be severer.

According to JIB B 8223, the preferred pH (hydrogen ion concentration index) is 8.5 through 9.7 for a heat recovery steam generator having a normal operation pressure of 10 MPa (gauge pressure) or less.

At the same time, the electric conductivity as an indicator for the total volume of impurities ion is preferred to be 6 mS/m or less when all volatile treatment is performed, according to the same regulation.

However, carbon dioxide, nitrogen oxides, etc. contained in the exhaust gas is absorbed in the recovered water so that the recovered water turns acid. Accordingly, it is necessary to supply a great amount of neutralizer in order to increase the pH value of the recovered water and to render it acid.

When recovered water is to be supplied with a great amount of neutralizer, two problems will arise. One is that the neutralizer purchasing cost will be increased and cost efficiency will be degraded. The other is that electric conductivity will be increased by the rise in the total amount of impurities ion.

As disclosed in Patent Literature 2, when concentration of impurities alone is prevented without the pH value of recovered water being adjusted, the portion in contact with recovered water is required to be made of corrosive materials. This raises a problem of increased construction costs of the facilities.

The object of the present invention is to provide a thermal power plant for recovering water from exhaust gas and a method for treating a recovered water of a thermal power plant for recovering water from exhaust gas, by adjusting the circulating water having been made acid by direct gas/liquid contact with exhaust combustion gas which is flowing through the recovered water system and adjusting the feed water to be reused as water fed to the boiler which is flowing through feed water system to have the required pH level, respectively, thereby reducing the amount of the pH adjuster to be used by the entire facilities, so that the thermal power plant with improved economic efficiency is realized.

Solution to Problem

The thermal power plant for recovering water from exhaust gas of the present invention comprising: a gas turbine; a heat recovery steam generator for generating steam by supplying exhaust combustion gas exhausted from the gas turbine as heat source; a water recovery system installed on the downstream side of the heat recovery steam generator for condensing and recovering water in the exhaust combustion gas through direct gas/liquid contact between the exhaust combustion gas coming down from the heat recovery steam generator and water; a recovered water system for supplying a part of the water recovered by the water recovery system, thereby allowing the water to be circulating as circulating water; a feed water system for supplying the heat recovery steam generator with other part of the water recovered by the water recovery system as feed water; a first pH adjusting system installed in the recovered water system to adjust the circulating water flowing through the recovered water system to a first pH value (hydrogen ion concentration index); a second pH adjusting system installed on the feed water system to adjust the feed water flowing through the feed water system to a second pH value (hydrogen ion concentration index); and a control system for controlling the volumes of the pH adjusters supplied from the first pH adjusting system and the second pH adjusting system.

A method for treating the recovered water of the thermal power plant for recovering water from the exhaust gas of the present invention, wherein the thermal power plant comprising: a gas turbine; a heat recovery steam generator for generating steam by supplying exhaust combustion gas exhausted from the gas turbine as heat source; a water recovery system installed on the downstream side of the heat recovery steam generator for condensing and recovering water in the exhaust combustion gas through direct gas/liquid contact between exhaust combustion gas coming down from the heat recovery steam generator and water; a recovered water system for supplying a part of the water recovered by the water recovery system, thereby allowing the water to be circulating as circulating water; a feed water system for supplying the heat recovery steam generator with other part of the water recovered by the water recovery system as feed water; a first pH adjusting system installed in the recovered water system to adjust the circulating water flowing through the recovered water system to a first pH value (hydrogen ion concentration index); a second pH adjusting system installed on the feed water system to adjust the feed water flowing through the feed water system to a second pH value (hydrogen ion concentration index); and a control system for controlling the volumes of the pH adjusters supplied from a first pH adjusting system and the second pH adjusting system; wherein the method for treating a recovered water of a thermal power plant for recovering water from exhaust gas comprising steps of: controlling by the control system the volume of chemicals supplied from the first pH adjusting system to the recovered water system is adjusted, and the circulating water circulating through the recovered water system is adjusted to a first pH value; and controlling by the control system the volume of chemicals supplied from the second pH adjusting system to the feed water system is adjusted, and the feed water flowing through the feed water system is adjusted to a second pH value.

Advantageous Effects of Invention

According to the present invention of a thermal power plant for recovering water from exhaust gas, and a method for treating a recovered water of a thermal power plant for recovering water from exhaust gas, by adjusting the circulating water having been made acid by direct gas/liquid contact with exhaust combustion gas which is flowing through the recovered water system and adjusting the feed water to be reused as water fed to the boiler which is flowing through feed water system to have the required pH level, respectively, thereby reducing the amount of the pH adjuster to be used by the entire facilities, so that the thermal power plant with improved economic efficiency can be achieved.

DESCRIPTION OF EMBODIMENTS

The humid air gas turbine system for recovering water from the exhaust gas as a thermal power plant of an embodiment according to the present invention will be described hereinafter with reference to the drawings.

Embodiment 1

In the first place, the humid air gas turbine system for recovering water from exhaust gas as a thermal power plant of the first embodiment according to the present invention will be described hereinafter with reference to FIG. 1.

Figure 1:
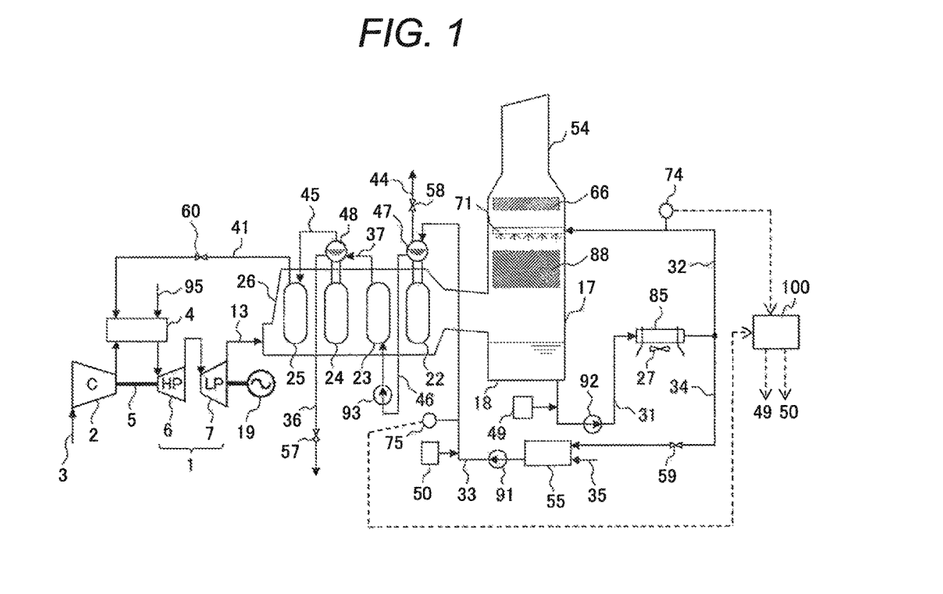
FIG. 1 is a schematic diagram of a humid air gas turbine system for recovering water from exhaust gas as a thermal power plant in a first embodiment of the present invention.

FIG. 1 is a schematic diagram of a humid air gas turbine system for supplying the gas turbine combustor with steam to increase the turbine output, as a thermal power plant in the first embodiment of the present invention.

In the humid air gas turbine system as a thermal power plant in the first embodiment of the present invention illustrated in FIG. 1, main body of the gas turbine is provided with a compressor 2 for compressing and discharging the air sucked from an inlet duct 3, a combustor 4 for mixing the air compressed by the compressor 2 with fuel 95 and combusting this mixture, and a turbine 1 driven by the high-temperature combustion gas generated by the combustor 4.

The turbine 1 is configured by a high-pressure turbine 6 and a low-pressure turbine 7. The high-pressure turbine 6 is connected to the compressor 2 through a shaft 5.

The low-pressure turbine 7 is connected to a generator 19 by a reduction gear (not illustrated). The low-pressure turbine 7 is turned to drive the generator 19, so that the power generated by the generator 19 can be sent to a power grid (not illustrated).

The exhaust gas 13 discharged from the low-pressure turbine 7 subsequent to driving the low-pressure turbine 7 is discharged into the atmosphere from a stack 54 after passing through a heat recovery steam generator 26 installed on the downstream side of the low-pressure turbine 7 to generate steam using exhaust gas 13 as a heat source and a water recovery system 17 for recovering water contained in the exhaust gas 13 having flown down through the heat recovery steam generator 26.

The aforementioned heat recovery steam generator 26 includes a deaerator 22, economizer 23, evaporator 24, and super-heater 25 in the order as viewed from the downstream side where the exhaust gas 13 is fed downward, toward the upstream side. The deaerator 22 and the evaporator 24 are provided with drum 47 and drum 48 for generating steam, respectively.

The feed water system for feeding water to the heat recovery steam generator 26 is equipped with a piping 33 capable of supplying the drum 47 of the deaerator 22 with the water stored in a tank 55 by transferring by a pump 91, a piping 46 capable of supplying an economizer 23 with the water stored in the deaerator drum 47 by applying pressure by a pump 93, a piping 37 capable of supplying the drum 48 of the evaporator 24 with the hot water heated by the economizer 23, and a piping 45 capable of feeding steam from the drum 48 of the evaporator 24 to the super-heater 25.

Further, the drum 47 of the deaerator is provided with a piping 44 which ensures that the gas dehydrated from feed water is discharged to the outside from the drum 47 through the valve 58.

Further, the drum 48 of the evaporator 24 is provided with a piping 36 which ensures that the impurities condensed under water are discharged to the outside from the drum 48 through the valve 57.

The aforementioned super-heater 25 installed on the extreme upstream side of the heat recovery steam generator 26 wherein the exhaust gas 13 is fed downstream is provided with a piping 41 having a valve 60 ensuring that the steam generated and superheated by the super-heater 25 is supplied from the super-heater 25 to the combustor 4.

In the humid air gas turbine system as a thermal power plant in the present embodiment, supply of steam to the combustor 4 indicates not only supply of steam to the interior of the combustor 4, but also supply of steam to the flow channel wherein compressed air flows down from the compressor 2 to the combustor 4 or the flow channel wherein combustion gas flows down from the combustor 4 to the high-pressure turbine 6.

The water recovery system 17 installed on the downstream side of the heat recovery steam generator 26 is designed to ensure that the water stored in the recovered water container 18 installed on the lower portion of the water recovery system 17 is pressurized by the pump 92 installed on the piping 31 and is supplied to the cooler 85 through the piping 31. After this water has been cooled by the cooler 85, the water is supplied again from the cooler 85 through the piping 32 to the liquid distributor 71 installed inside the water recovery system 17, so that water is distributed inside the water recovery system 17.

A packing 88 is installed on the lower portion of the liquid distributor 71 inside the water recovery system 17 to ensure that a gas/liquid contact can be performed between the exhaust gas discharged from the heat recovery steam generator 26 and circulating water distributed from the liquid distributor 71.

A mist eliminator 66 for eliminating mist is installed above the liquid distributor 71 inside the water recovery system 17.

The aforementioned cooler 85 is an air-cooled radiator for cooling the water by introducing the ambient air from a fan 27. Part of the circulating water cooled by the cooler 85 is supplied to the tank 55 through the piping 34 having a valve 59.

The tank 55 is further provided with a piping 35 so that make-up water can be supplied from the outside.

In the humid air gas turbine system as a thermal power plant of the present embodiment, a recovered water system is the name given to a system wherein the recovered water of the water recovery system 17 is distributed from the liquid distributor 71 installed inside the aforementioned water recovery system 17 through the recovered water container 18, cooler 85 and piping 32, is fed down through the packing 88 installed inside the water recovery system 17, and is again fed to the recovered water container 18 in circulation.

In the humid air gas turbine system as a thermal power plant of the present embodiment, a feed water system is the name given to a system leading from the piping 34 which splits the circulating water from the recovered water system, to the drum 48 of the evaporator 24 of the heat recovery steam generator 26.

The characteristic components in humid air gas turbine system as a thermal power plant of the present embodiment include a chemical dosing system 49 installed in the piping 31 for supplying recovered water to the cooler 85 from the recovered water container 18 of the recovered water system for the purpose of adjusting pH value of circulating water to a first pH value; a pH sensor 74 installed in the piping 32 branching off from the cooler 85; a chemical dosing system 50 installed the piping 33 of the feed water system for the purpose of adjusting the pH value of feed water to be supplied to the drum 47 of the deaerator 22, to the second pH value; a pH sensor 75 installed on the downstream side of the aforementioned chemical dosing system 50 of the other piping 32 branching off from the aforementioned cooler 85; and a control system 100 for controlling the chemical dosing system 49 for adjusting the pH value of the circulating water based on the pH value detected by the pH sensor 74, and the chemical dosing system 50 for adjusting the pH value of feed water based on the pH value detected by the pH sensor 75, respectively.

The humid air gas turbine system having the aforementioned structure as a thermal power plant of the present embodiment consumes a large amount of water to generate steam. Accordingly, humid air contained in the exhaust combustion gas 13 is recovered from the exhaust combustion gas 13 discharged from the gas turbine 1 and the recovered water is reused by the heat recovery steam generator.

The recovered water from the exhaust combustion gas 13 is acid due to absorption of impurities such as nitrogen oxides and carbon dioxide contained in the exhaust combustion gas 13.

In the feed water for supplying this recovered water to the heat recovery steam generator 26 for generating steam, the concentration of dissolved oxygen, hydrogen ion concentration index (pH) are adjusted by chemical dosing in order to prevent the heat transfer pipe of the heat recovery steam generator 26 from being corroded.

In the humid air gas turbine system as a thermal power plant of the present embodiment, the required volume of chemicals to be supplied is minimized by effectively adjusting pH value.

The following describes the operation of the humid air gas turbine system as a thermal power plant of the first embodiment of the present invention with reference to FIG. 1.

In the humid air gas turbine system as a thermal power plant of the first embodiment shown in FIG. 1, the atmospheric air sucked from the inlet duct 3 of the gas turbine into the compressor 2 is compressed by the aforementioned compressor 2, and is discharged from the compressor 2 as high-temperature compressed air.

The compressed air discharged from the compressor 2 is led to the combustor 4 through the flow channel inside the gas turbine casing.

The compressed air led to the combustor 4 is mixed with the fuel 95 and the superheated steam supplied from the piping 41 in the aforementioned combustor 4, and is combusted. Then high-temperature, high-pressure combustion gas is generated by the combustor 4.

The high-temperature, high-pressure combustion gas generated by the combustor 4 is supplied to the high-pressure turbine 6 of the turbine 1 from the combustor 4 and is expanded inside this high-pressure turbine 6 so that the thermal energy is converted into dynamic energy.

The high-pressure turbine 6 and compressor 2 are connected with each other by a common shaft 5. The dynamic energy converted from thermal energy by this high-pressure turbine 6 is consumed to drive the compressor 2 connected with the shaft 5.

The combustion gas expanded inside the high-pressure turbine 6 is supplied to the low-pressure turbine 7 from the high-pressure turbine 6, and is expanded inside the low-pressure turbine 7 so that the thermal energy is converted into dynamic energy.

The dynamic energy converted from thermal energy by low-pressure turbine 7 is converted into electric energy by driving the generator 19 connected to this low-pressure turbine 7, and is then taken out.

In the humid air gas turbine system as a thermal power plant of the present embodiment, the steam generated in the heat recovery of the heat recovery steam generator 26 is added as humid air to the air to be combusted together with the fuel by the combustor 4. Accordingly, the flow rate of the combustion gas supplied from the combustor 4 to the turbine 1 is greater than that in the normal simple-cycle gas turbine by the volume of added steam.

Further, the thermal energy per unit mass of steam is greater than that of the compressed air. This allows a greater volume of energy to be taken out than that in the normal gas turbine, with the result that the output of the entire gas turbine and thermal efficiency are improved.

The exhaust gas 13 discharged from this low-pressure turbine 7 through the expansion process in the low-pressure turbine 7 is led as a heat source to the heat recovery steam generator 26 installed on the downstream side of the gas turbine 1.

In the heat recovery steam generator 26, the feed water supplied through the piping 33 is heated by a heat source which is the exhaust gas 13 flowing down inside the heat recovery steam generator 26, by means of a deaerator 22 installed on the extreme downstream side in the flow direction of exhaust gas inside the heat recovery steam generator 26. Dissolved gas contents in water such as oxygen or carbon dioxide contained in the feed water are moved to vapor phase by this deaerator 22 and are discharged from the deaerator 22 to the outside through the piping 44.

The feed water heated by the exhaust gas 13 flowing down inside the heat recovery steam generator 26 in the aforementioned deaerator 22 is supplied to the economizer 23 arranged on the upstream side of this deaerator 22 in the flow direction of exhaust gas inside the heat recovery steam generator 26. This feed water is heated by this economizer 23 wherein the exhaust gas 13 flowing down inside the heat recovery steam generator 26 is used as a heat source.

The feed water heated by the exhaust gas 13 flowing down inside the heat recovery steam generator 26 by the aforementioned economizer 23 is supplied to the evaporator 24 arranged on the upstream side of this economizer 23 in the flow direction of the exhaust gas in the heat recovery steam generator 26. The aforementioned feed water is heated by this evaporator 24 wherein the exhaust gas 13 flowing down inside the heat recovery steam generator 26 is used as a heat source.

Further, the feed water heated by the exhaust gas 13 flowing down inside the heat recovery steam generator 26 in the aforementioned evaporator 24 is supplied to the super-heater 25 arranged on the extreme upstream side of this evaporator 24 in the flow direction of the exhaust gas inside the heat recovery steam generator 26, and is further heated by this super-heater 25 wherein the exhaust gas 13 flowing down inside the heat recovery steam generator 26 is used as a heat source.

As described above, the feed water is heated sequentially by the economizer 23, evaporator 24 and super-heater 25 inside the heat recovery steam generator 26 so that high-temperature, high-pressure steam is generated. This generated high-temperature, high-pressure steam is supplied from the super-heater 25 to the combustor 4 of the aforementioned gas turbine through the piping 41 equipped with a valve 60.

The deaerator 22 installed in the aforementioned heat recovery steam generator 26 is driven at low pressure of about 0.2 MPa, for example, and is operated so that dissolved gas contents dissolved in water can be easily discharged into the vapor phase. After that, the feed water is pressurized to about 3 MPa by the pump 93 installed in the piping 46, and is supplied to the evaporator 24 from the deaerator 22 through the piping 46. This evaporator 24 allows the feed water to be heated by the exhaust gas 13 flowing down inside the heat recovery steam generator 26, so that high-temperature, high-pressure steam is generated.

The concentrated impurities contained in feed water is extracted from the drum 48 of the evaporator 24 out of the system by the piping 36 equipped with a valve 57, thereby restricting the concentration of impurities in the feed water stored inside the heat transfer tube of the evaporator 24.

The high-temperature, high-pressure steam generated by the super-heater 25 is supplied to the combustor 4 through the piping 41 equipped with valve 60, thereby improving the gas turbine output and efficiency.

The exhaust gas 13 discharged from the heat recovery steam generator 26 is led to the water recovery system 17 installed on the downstream side of the heat recovery steam generator 26.

In the aforementioned water recovery system 17, the recovered water stored in the recovered water container 18 provided in the lower space inside the water recovery system 17 is supplied to the cooler 85 through the piping 31 by the pump 92 provided on the piping 31. The recovered water is cooled down to 35 degrees Celsius, for example, through heat change with atmosphere by this cooler 85. The water is then supplied from the cooler 85 through the piping 32 to the liquid distributor 71 installed inside the water recovery system 17 and is distributed.

The water distributed from this liquid distributor 71 makes a direct gas/liquid contact with the exhaust gas 13 supplied from below the packing 88 in the process of flowing down the surface of the packing 88 installed below the liquid distributor 71 inside the water recovery system 17. The water vapor contained in the exhaust gas 13 is condensed and is recovered as recovered water into the recovered water container 18 of the water recovery system 17.

The exhaust gas 13 after making a gas/liquid contact on the surface of the packing 88 is discharged into the atmosphere through the stack 54 communicating with the space above this recovery system 17, after fine droplets produced at the time of gas/liquid contact with distributed water have been removed by the mist eliminator 66 installed above the liquid distributor 71 inside the recovery system 17.

In this case, the exhaust gas 13 discharged from the stack 54 is wet gas (having a temperature of 40 degrees Celsius or less, for example) cooled by the water distributed from the liquid distributor 71. After this gas has been discharged into the atmosphere, the water vapour may be condensed and turned into visible plume in some cases.

If formation of visible plume is to be restricted from the point of view of aesthetics, a heating means for heating the exhaust gas can be installed on the downstream side of the mist eliminator 66.

Part of the water recovered from the recovered water container 18 of the water recovery system 17 is branched off from the downstream side of the cooler 85 of the piping 31. It is supplied to the liquid distributor 71 from the cooler 85 through the piping 32 and is distributed into the water recovery system 17. The other part of water is supplied from the cooler 85 to the tank 55 for supplying make-up water through the piping 34 equipped with a valve 59.

The water level in the recovered water container 18 of the water recovery system 17 is changed in conformity to the balance between the volume of water recovered by condensation of the exhaust gas 13 and the volume of feed water supplied to the tank 55 for supplying feed water through the branched piping 34.

The opening of the valve 59 installed on the piping 34 is adjusted to maintain the water level of the recovered water container 18 to a specified level.

The make-up water stored in the tank 55 is supplied to the drum 47 connected to the deaerator 22 when the pump 91 provided on the piping 33 is driven, and is used to generate steam for humidifying the gas turbine.

In this case, if the volume of water supplied to the tank 55 by recovery at the water recovery system 17 is smaller than the volume of feed water supplied to the heat recovery steam generator 26, the water level of the tank 55 is reduced. Accordingly, make-up water is supplied to the tank 55 from the outside through the piping 35, thereby maintaining the water level of the tank 55.

The following describes the operation of the characteristic components in the humid air gas turbine system as a thermal power plant as a first embodiment of the present invention.

The humid air gas turbine system as a thermal power plant of the first embodiment illustrated in FIG. 1 is provided with a control system 100. This control system 100 stores the pH output detected by the pH sensor 74 installed on the piping 32 to detect the pH value of the recovered water flowing through the piping 32 and the pH output detected by the pH sensor 75 installed on the piping 33 to detect the pH value of the feed water flowing through the piping 33, respectively.

In the aforementioned control system 100, based on the deviation between the pH detection value of the circulating water as the recovered water flowing through the piping 32 detected by the aforementioned pH sensor 74 and the target pH value, a command signal is outputted from the control system 100 to the chemical dosing system 49 installed on the piping 31, thereby controlling the dose of chemicals to be supplied into the circulating water flowing through the piping 31 from the chemical dosing system 49.

This chemical dosing control is a commonly known art called the proportional-integral controller. The target pH value of the circulating water is assumed as pH=7.0 in the humid air gas turbine system of the present embodiment.

In the humid air gas turbine system as a thermal power plant of the first embodiment, morpholine ($C_4H_9ON$) was selected as the chemical for adjusting the pH value by controlling the supply of chemicals to the circulating water from the chemical dosing system 49 installed on the piping 31 of the recovered water system. Morpholine is a basic organic compound commonly employed to adjust the quality of boiler water as a pH adjuster.

The feed water supplied to the heat recovery steam generator 26 is preferred to have a pH value of 8.5 through 9.7 in conformity to the JIS B 8223. Despite that, the pH value of the circulating water of this recovered water system is adjusted to 7.0 for the following reasons:

The exhaust gas and circulating water as recovered water flowing through the piping 32 regularly make a direct gas/liquid contact with each other in the water recovery system 17, with the result that carbon dioxide in the exhaust gas is dissolved as a great amount of free carbon dioxide in the circulating water by the reactions in conformity to Chemical Formula (1) and Chemical Formula (2).

In the humid air gas turbine system as a thermal power plant of the present embodiment, the concentration of free carbon dioxide is 4.80E−4 [mol/L] based on the concentration of carbon dioxide in the exhaust combustion gas and Henry's constant as a coefficient for gas-liquid equilibrium. In the aforementioned Chemical Formula (1) and Chemical Formula (2), (g) denotes a molecule in gas and (l) represents a molecule dissolved in liquid.

The dissolved free carbon dioxide is dissociated in water by the reaction of Chemical Formula (3) and is formed into a hydrogen carbonate ion. The concentration of hydrogen carbonate ion is determined by acid dissociation constant $K_a$ as Henry's constant of Chemical Formula (3).

In the humid air gas turbine system of the present embodiment, as illustrated in Table 1, when the concentration of free carbon dioxide is 4.80E−4 [mol/L], acid dissociation constant $K_a$ is 4.47E−7 [mol/L], which yields acid state pH=4.8.

When morpholine as a neutralizer has been supplied in this state, morpholine receives hydrogen ion and produces hydroxide ion through the reaction in conformity to Chemical Formula (4), with the result that the concentration of hydrogen ion is reduced, while the pH value is increased.

In the meantime, since the concentration of hydrogen ion has been reduced in conformity to Chemical Formula (3), reaction proceeds rightwards in Chemical Formula (3) according to the dissociation constant $K_a$ of Chemical Formula (3), thereby increasing the concentration of hydrogen carbonate ion.

As described above, even if the concentration of hydrogen ion is reduced by supply of a pH adjuster, free carbon dioxide will dissociate to generate new hydrogen carbonate ion. Thus, an enormous amount of pH adjuster needs to be supplied in order to raise the pH value.

$$CO_2(g) \leftrightarrow CO_2(l) \quad \text{Chemical Formula (1)}$$

$$CO_2(l) + H_2O(l) \leftrightarrow H_2CO_3(l) \quad \text{Chemical Formula (2)}$$

$$K_a$$

$$H_2CO_3(l) \leftrightarrow H^+ + HCO_3^- \quad \text{Chemical Formula (3)}$$

$$K_b$$

$$C_4H_9ON(l) + H_2O(l) \leftrightarrow C_4H_{10}ON^+ + OH^- \quad \text{Chemical Formula (4)}$$

TABLE 1

| | Concentration | | |
|---|---|---|---|
| Hydrogen ion concentration index | Carbonic acid | Hydrogen ion | Hydrogen carbonate ion |
| Symbol | | | |
| pH | [$H_2CO_3$] | [$H^+$] | [$HCO_3^-$] |
| Unit | | | |
| — | mol/L | mol/L | mol/L |
| Before reaction 7.0 | 4.80E−04 | 1.00E−07 | 0.00E+00 |
| After reaction 4.8 | 4.80E−04 | 1.47E−05 | 1.46E−05 |

Table 2 shows the result of calculating the molar concentration of pH adjuster required to increase the pH value from the acid state of pH=4.8 in the recovered water system.

The circulating water of the recovered water system is always kept in contact with the exhaust gas in the water recovery system 17 so that the concentration of free carbon dioxide remains constant at all times. As a result, to increase pH value, i.e., to reduce the concentration of hydrogen ion by the pH adjuster, reaction of the Chemical Formula (3) proceeds rightwards and the concentration of hydrogen carbonate ion ($HCO_3^-$) increases.

When the circulating water of the recovered water system reaches the target pH value of 7.0, the concentration of hydrogen carbonate ion increases from 1.46E−5 [mol/L] to 2.15E−3 [mol/L]. The required pH adjuster ion concentration will be 2.13E−3 [mol/L] which corresponds to this difference.

Not all the supplied pH adjusters are ionized. Ionization is performed according to the base dissociation constant Kb of Chemical Formula (4). Thus, if the concentration of the hydroxide ion is increased with pH value, the ratio of dissociation is reduced.

As illustrated in Table 2, the ratio of morpholine dissociation is 96.9% at pH=7.0, and the required morpholine concentration is 2.20E−3 [mol/L].

To adjust the circulating water of the recovered water system to the level of pH=10, for example, the pH adjuster of 7.16E+1 [mol/L] is required in the similar manner. To be more specific, this requires the morpholine concentration approximately 3300 times that for adjustment to a level of pH=7.0.

This is clearly uneconomical. Further, the feed water of the heat recovery steam generator 26 has to conform to the requirement standards for electric conductivity in addition to the pH value. Supply of a large amount of neutralizer is not preferred because an increase in electric conductivity is inevitable.

The reason for adjusting the pH value of the circulating water of the recovered water system up to 7.0 without allowing it to be kept at 4.8 is to maintain the integrity of the metallic member of the recovered water system.

In the carbon steel, the volume of corrosion tends to increase with the decrease in pH value. Further, the copper alloy is known to be impervious to corrosion if the pH value is in the vicinity of 7.0.

In the humid air gas turbine system as a thermal power plant of the present embodiment, the liquid-contact member of the recovered water system has its carbon steel portion coated with painting or plastic lining. The cooler 85 employs a copper alloy tube and the pH value is adjusted to 7.0. This treatment maintains the integrity of the metallic member of the recovered water system and reduces the volume of pH adjuster to be supplied, thereby ensuring economical operation of the facilities.

TABLE 2

| Concentration | Hydrogen ion concentration index | Carbonic acid | Hydrogen ion | Hydrogen carbonate ion | pH adjustor (after ionization) | Ionization percentage of pH adjustor | pH adjustor (before ionization) |
|---|---|---|---|---|---|---|---|
| Symbol | pH | [$H_2CO_3$] | [$H^+$] | [$HCO_3^-$] | [$C_4H_{10}ON^+$] | — | [$C_4H_9ON$] |
| Unit | — | mol/L | mol/L | mol/L | mol/L | — | mol/L |
| Before pH adjustment | 4.8 | 4.80E−04 | 1.47E−05 | 1.46E−05 | — | — | — |
| After pH adjustment (Recovered water system) | 5.0 | 4.80E−04 | 1.00E−05 | 2.15E−05 | 6.86E−06 | 1.00E+00 | 6.86E−06 |
| | 6.0 | 4.80E−04 | 1.00E−06 | 2.15E−04 | 2.00E−04 | 9.97E−01 | 2.01E−04 |
| | 7.0 | 4.80E−04 | 1.00E−07 | 2.15E−03 | 2.13E−03 | 9.69E−01 | 2.20E−03 |
| | 8.0 | 4.80E−04 | 1.00E−08 | 2.15E−02 | 2.14E−02 | 7.56E−01 | 2.84E−02 |
| | 9.0 | 4.80E−04 | 1.00E−09 | 2.15E−01 | 2.14E−01 | 2.36E−01 | 9.09E−01 |
| | 10.0 | 4.80E−04 | 1.00E−10 | 2.15E+00 | 2.15E+00 | 3.00E−02 | 7.16E+01 |
| | 11.0 | 4.80E−04 | 1.00E−11 | 2.15E+01 | 2.15E+01 | 3.08E−03 | 6.96E+03 |
| | 12.0 | 4.80E−04 | 1.00E−12 | 2.15E+02 | 2.15E+02 | 3.09E−04 | 6.94E+05 |

Similarly, in the aforementioned control system 100, a command signal is outputted to the chemical dosing system 50 installed on the piping 33, based on the deviation between the detected pH value of the feed water flowing through the piping 33 as detected by the pH sensor 75 and the target pH value, thereby controlling the volume of chemicals supplied to the feed water running through the piping 33 from the aforementioned chemical dosing system 50.

In the humid air gas turbine system as a thermal power plant of the present embodiment, morpholine ($C_4H_9ON$) was selected as the chemical for adjusting the pH value to be supplied to the feed water from the chemical dosing system 50 installed on the piping 33, in this feed water system as well. However, the target pH value of the feed water was pH=10.0, unlike the case of the circulating water for the recovered water system.

If the pH adjuster is supplied to the feed water running through the piping 33 in the chemical dosing system 50, there will be a reduction in the volume of hydrogen carbonate ion in feed water. Thus, the reaction of Chemical Formula (3) proceeds rightwards. However, unlike the case of the chemical dosing system 49 in the recovered water system, the concentration of free carbon dioxide on the left-hand side of Chemical Formula (3) is reduced and carbon dioxide cannot be newly absorbed from exhaust gas despite reduction in the volume of free carbon dioxide, with the result that the concentration of free carbon dioxide reduces.

Table 3 shows the result of calculating the molar concentration of pH adjuster in the volume required to increase the pH value from the acid state of pH=7.0 in the feed water system. The free carbon dioxide on the left side of the Chemical Formula (3) changes into the hydrogen carbonate ion on the right side. Accordingly, as shown in Table 3, if the pH value is increased, concentration of hydrogen carbonate ion is also increased, but the increase is much smaller than that in the case of the recovered water system illustrated in Table 2.

The concentration of morpholine required to increase the pH value from pH=7 to pH=10.0 is 1.60E−2 [mol/L]. This implies that adjustment can be made by the pH adjuster in the amount smaller than 1/20000 that for adjustment within the same range in the recovered water system.

Figure 2:
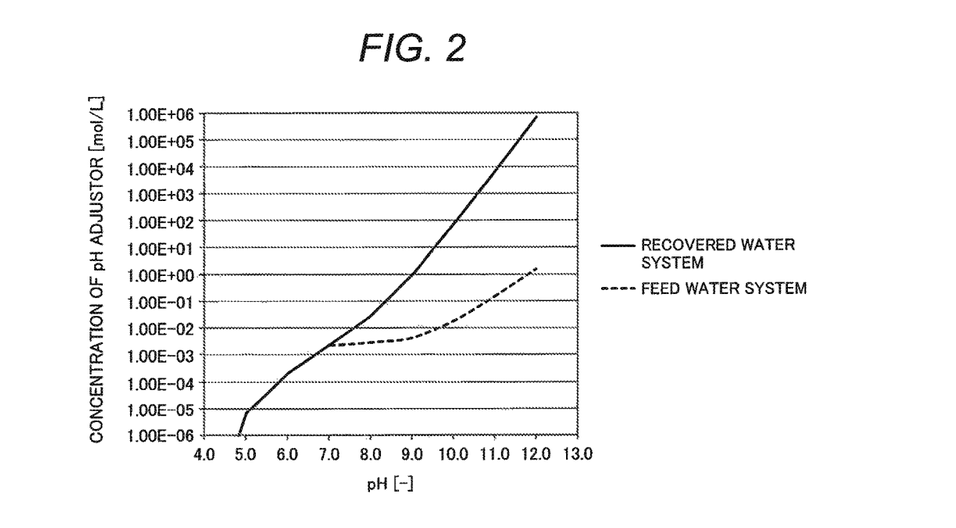
FIG. 2 is a characteristic diagram showing the relationship between the pH adjustment value in the humid air gas turbine system as a thermal power plant in a first embodiment of the present invention, and the required concentration of pH adjuster.

After that, when the pH value of the recovered water is to be increased further, the concentration of the pH adjuster is exponentially increased, as illustrated by a solid line in FIG. 2, if the pH adjuster is supplied in the recovered water system. However, if the pH adjuster is supplied in the feed water system, there will be a gradual increase in the concentration of the pH adjuster, as illustrated by the broken line.

As described with reference to the humid air gas turbine system as a thermal power plant of the present embodiment, a substantial reduction in the entire usage of pH adjuster is achieved by making pH adjustment in two phases, namely, by making distinction between the pH adjustment value in the recovered water system and that in the feed water system. This method further maintains the integrity of the metallic member of the recovered water system and ensures economical operation of the facilities at the same time.

As described above, the feed water whose pH value has been adjusted by supply of chemicals by the chemical dosing system 50 is supplied to the drum 47 of the heat recovery steam generator 26 through the piping 33, and water in the drum 47 is heated in the deaerator 22 of the heat recovery steam generator 26 connected with the drum 47.

The Henry's constant changes when the feed water is heated by the deaerator 22. Thus, the reaction of Chemical Formula (1) proceeds leftward and the reaction of Chemical Formula (2) also proceeds leftward, with the result that free carbon dioxide is discharged as a gas out of the system.

Further, since the oxygen dissolved in water is also discharged by the same mechanism, the concentration of dissolved oxygen is reduced. This reduces the corrosion of the heat transfer tube of the heat recovery steam generator 26, and permits operation of the facilities at the same time.

In the humid air gas turbine system of the present embodiment, the chemical is explained only with reference to pH adjuster. It goes without saying that, in conformity to the specifications of the boiler to be used and the quality of water to be used, other chemicals used commonly for boiler

TABLE 3

| Concentration | Hydrogen ion concentration index | Carbonic acid | Hydrogen ion | Hydrogen carbonate ion | pH adjustor (after ionization) | Ionization percentage of pH adjustor | pH adjustor (before ionization) |
|---|---|---|---|---|---|---|---|
| Symbol | pH | $[H_2CO_3]$ | $[H^+]$ | $[HCO_3^-]$ | $[C_4H_{10}ON^+]$ | — | $[C_4H_9ON]$ |
| Unit | — | mol/L | mol/L | mol/L | mol/L | — | mol/L |
| Before pH adjustment | 4.8 | 4.80E−04 | 1.47E−05 | 1.46E−05 | — | — | — |
| After pH adjustment (Recovered water system | 5.0 | 4.80E−04 | 1.00E−05 | 2.15E−05 | 6.86E−06 | 1.00E+00 | 6.86E−06 |
| | 6.0 | 4.80E−04 | 1.00E−06 | 2.15E−04 | 2.00E−04 | 9.97E−01 | 2.01E−04 |
| | 7.0 | 4.80E−04 | 1.00E−07 | 2.15E−03 | 2.13E−03 | 9.69E−01 | 2.20E−03 |
| After pH adjustment (Feed water system | 8.0 | 1.70E−12 | 1.00E−08 | 2.63E−03 | 4.80E−04 | 7.56E−01 | 2.83E−03 |
| | 9.0 | 1.70E−13 | 1.00E−09 | 2.63E−03 | 4.80E−04 | 2.36E−01 | 4.23E−03 |
| | 10.0 | 1.70E−14 | 1.00E−10 | 2.63E−03 | 4.80E−04 | 3.00E−02 | 1.82E−02 |
| | 11.0 | 1.70E−15 | 1.00E−11 | 2.63E−03 | 4.80E−04 | 3.08E−03 | 1.58E−01 |
| | 12.0 | 1.70E−16 | 1.00E−12 | 2.63E−03 | 4.80E−04 | 3.09E−04 | 1.56E+00 |

The characteristic diagram of FIG. 2 shows the comparison of calculation results according to Tables 2 and 3. The characteristic diagram of FIG. 2 gives the concentration of the pH adjuster required to increase the pH value of the recovered water when pH=4.8.

In the characteristic diagram of FIG. 2, a solid line indicates the portion to be adjusted from pH=4.8 to pH=7.0 in the recovered water system.

water chemistry control such as deoxidizing agent, boiler compounds, and corrosion inhibitor can be used in combination for this embodiment.

In the humid air gas turbine system of the present embodiment, morpholine has been described as an example of pH adjusters. However, the present embodiment can be implemented by using other chemicals having a pH adjusting function than morpholine, such as ammonium, caustic soda, disodium phosphate and trisodium phosphate.

In the humid air gas turbine system of the present embodiment, the pH adjustment value of the recovered water system was 7.0 by way of an example. The pH adjustment value of the circulating water flowing in the recovered water system is preferably kept within the range from 6.0 to 8.0.

When the pH value is less than 6.0, the usage of the pH adjuster can be reduced. However, if a copper-made member is used in the cooler 85 and others, the integrity of the member may not be maintained for a long time.

When the pH value is 8.0 or more, the usage of the pH adjuster will be increased exponentially relative to the pH value, and economic efficiency may be reduced.

In the humid air gas turbine system of the present embodiment, the pH adjustment value of the feed water system was 10.0 by way of an example. The pH adjustment value of the feed water running in the feed water system is preferably kept in the range from 8.0 to 12.0.

When the pH value is 8.0, the usage of pH adjuster can be reduced. However, depending on the liquid-contact member of the heat recovery steam generator, the integrity of the member may not be maintained for a long time.

When the pH value is 12.0 or more, the corrosion of metallic material can be prevented positively even if there is a reduction in the pH value in the equipment on the downstream side subsequent to supply of the pH adjuster. However, the usage of the pH adjuster will be increased exponentially relative to the pH value, and economic efficiency may be reduced.

The installation positions of the chemical dosing system 49 and pH sensor 74 are not restricted to the positions illustrated with reference to the humid air gas turbine system of the present embodiment. If the chemical dosing system 49 and pH sensor 74 are installed in any of the recovered water system, to be more specific, the internal space of the water recovery system 17, the recovered water container 18, piping 31 or piping 32, changes in the pH value resulting from supply of chemicals can be identified, since any of these positions is included in the route of the circulating water running in the water recovery system 17. This allows the volume of supply to be placed under control.

As will be clear from the above description, according to the present embodiment of a thermal power plant for recovering water from exhaust gas, and a method for treating a recovered water of a thermal power plant for recovering water from exhaust gas, by adjusting the circulating water having been made acid by direct gas/liquid contact with exhaust combustion gas which is flowing through the recovered water system and adjusting the feed water to be reused as water fed to the boiler which is flowing through feed water system to have the required pH level, respectively, thereby reducing the amount of the pH adjuster to be used by the entire facilities, so that the thermal power plant with improved economic efficiency can be achieved.

Embodiment 2

Figure 3:
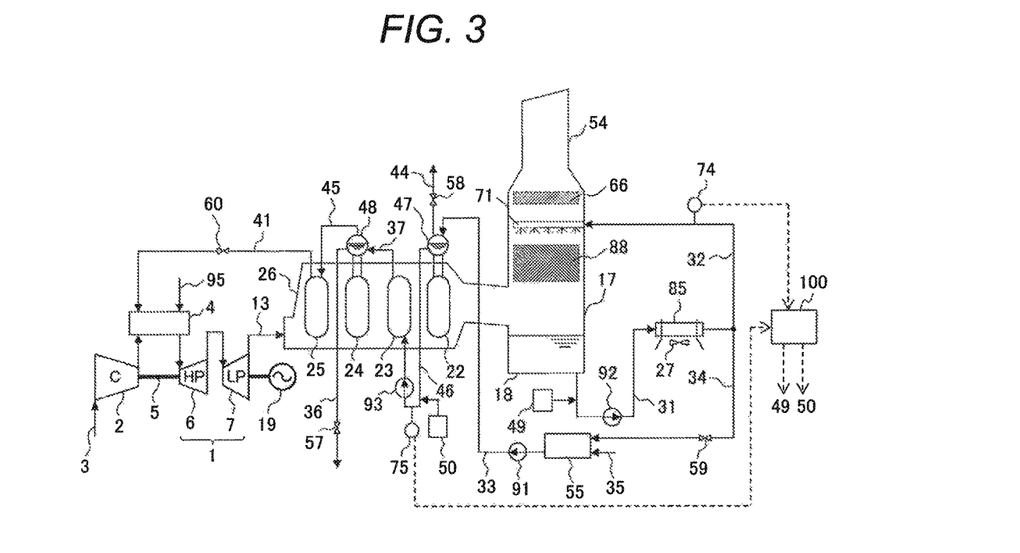
FIG. 3 is a schematic diagram of a humid air gas turbine system for recovering water from the exhaust gas as a thermal power plant in a second embodiment of the present invention.

The following describes the humid air gas turbine system for recovering water from exhaust gas as a thermal power plant of the second embodiment of the present invention with reference to FIG. 3.

The humid air gas turbine system as a thermal power plant of the second embodiment illustrated in FIG. 3 has basically the same structure and functions as those of the humid air gas turbine system for recovering water from exhaust gas as a thermal power plant of the first embodiment illustrated in FIG. 1. Accordingly, the same structures as those of the humid air gas turbine system in the first embodiment will not be described. The following description will be restricted only to the differences.

In the humid air gas turbine system for recovering water from exhaust gas as a thermal power plant of the second embodiment of the present invention illustrated in FIG. 3, the structural differences from the humid air gas turbine system of the first embodiment in FIG. 1 can be shown as follows:

In the humid air gas turbine system of the first embodiment in FIG. 1, the chemical dosing system 50 and pH sensor 75 are installed on the piping 33; whereas, in the humid air gas turbine system of the second embodiment in FIG. 3, the chemical dosing system 50 and pH sensor 75 are installed on the piping 46 for feeding water to the economizer 23 from the drum 47 of the deaerator 22.

The following describes the operations of characteristic components in humid air gas turbine system for recovering water air from exhaust gas as a thermal power plant of the second embodiment with reference to FIG. 3.

In the humid air gas turbine system as a thermal power plant of the second embodiment, the water stored in the tank 55 for supplying feed water is adjusted in the recovered water system to have a pH value of 7, similarly to the case of the humid air gas turbine system of the first embodiment.

This stored water is fed to the drum 47 connected to the deaerator 22 installed in the extreme downstream portion inside the heat recovery steam generator 26, and the water stored in the drum 47 is heated by the exhaust gas 13 as a heat source flowing inside the heat recovery steam generator 26 by the deaerator 22.

The Henry's constant changes when the feed water is heated. Thus, the reaction of Chemical Formula (1) proceeds leftward and the reaction of Chemical Formula (2) also proceeds leftward, with the result that free carbon dioxide is discharged as a gas out of the system through the piping 44 equipped with valve 58.

After the free carbon dioxide has been discharged out of the system as gas through the drum 47, the feed water has its pH value detected by the pH sensor 75 installed on the piping 46 for feeding water to the economizer 23 from the drum 47 of the deaerator 22.

In the aforementioned control system 100, based on the deviation between the pH detection value of the feed water flowing through the piping 46 detected by this pH sensor 75 and the target pH value, a command signal is outputted to the chemical dosing system 50 installed on the piping 46, and chemicals are supplied to the feed water flowing through the piping 46 from the chemical dosing system 50, whereby the pH level of the feed water flowing down the piping 46 is adjusted to 10.0.

The concentration of the free carbon dioxide in the feed water prior to the operation of the chemical dosing system 50 is made smaller than that of the humid air gas turbine system of the first embodiment by the action of the deaerator 22. Accordingly, in the humid air gas turbine system of the present embodiment, the pH value of the feed water can be adjusted by the pH adjuster in the amount smaller than that for the humid air gas turbine system of the first embodiment.

In the meantime, the pH value of the feed water supplied to the deaerator 22 is 7.0 in the humid air gas turbine system of the present embodiment. This brings about a restriction on the component materials of the deaerator 22 including the drum 47.

As described above, in the humid air gas turbine system of the present embodiment, a substantial reduction in the entire usage of pH adjuster is achieved by making pH adjustment in two phases, namely, by making distinction between the pH adjustment value in the recovered water system and that in the feed water system. This method maintains the integrity of the metallic member of the recovered water system and ensures economical operation of the facilities at the same time.

Two cases have been introduced wherein there is a difference in the installation positions of the chemical dosing system 50 and pH sensor 75 between the humid air gas turbine system of the first embodiment given in FIG. 1 and that of the second embodiment in FIG. 3. If these devices are installed in any of the places of the feed water system, the same advantageous effect can be achieved, even when the installation positions is other than the positions for chemical dosing system 50 or pH sensor 75 in the humid air gas turbine system of each of the embodiments shown in FIG. 1 and FIG. 3.

As will be clear from the above description, according to the present embodiment of a thermal power plant for recovering water from exhaust gas, and a method for treating a recovered water of a thermal power plant for recovering water from exhaust gas, by adjusting the circulating water having been made acid by direct gas/liquid contact with exhaust combustion gas which is flowing through the recovered water system and adjusting the feed water to be reused as water fed to the boiler which is flowing through feed water system to have the required pH level, respectively, thereby reducing the amount of the pH adjuster to be used by the entire facilities, so that the thermal power plant with improved economic efficiency can be achieved.

Embodiment 3

Figure 4:
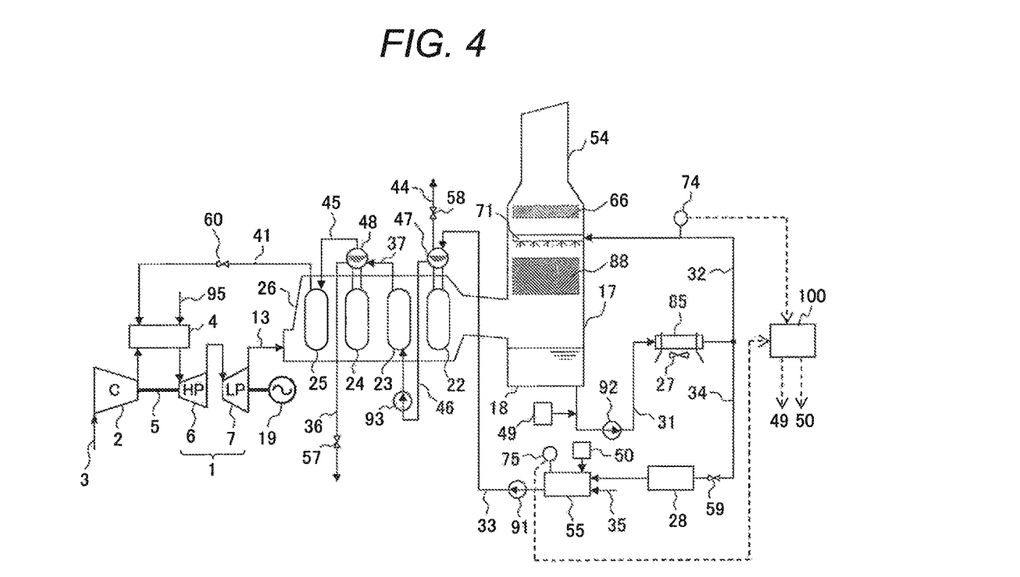
FIG. 4 is a schematic diagram of a humid air gas turbine system for recovering water from the exhaust gas as a thermal power plant in a third embodiment of the present invention.

The following describes the humid air gas turbine system for recovering water from exhaust gas as a thermal power plant of the third embodiment of the present invention with reference to FIG. 4.

The humid air gas turbine system as a thermal power plant of the third embodiment illustrated in FIG. 4 has basically the same structure and functions as those of the humid air gas turbine system for recovering water from exhaust gas as a thermal power plant of the first embodiment illustrated in FIG. 1. Accordingly, the same structures as those of the humid air gas turbine system in the first embodiment will not be described. The following description will be restricted only to the differences.

In the humid air gas turbine system for recovering water from exhaust gas as a thermal power plant of the third embodiment of the present invention illustrated in FIG. 4, the structural differences from the humid air gas turbine system of the first embodiment in FIG. 1 can be shown as follows:

In the humid air gas turbine system of the first embodiment in FIG. 1, the chemical dosing system 50 and pH sensor 75 are installed on the piping 33; whereas, in the humid air gas turbine system of the third embodiment in FIG. 4, the chemical dosing system 50 and pH sensor 75 are installed on the tank 55 for feeding water.

The aforementioned chemical dosing system 50 is installed so that chemicals are supplied inside the tank 55. The aforementioned pH sensor 75 is installed to permit measurement of the pH value of the water stored in the tank 55.

An agitating device (not illustrated) is installed inside the tank 55, and is operated to ensure uniform mixture of water stored in the tank 55.

Further, a water purification system 28 is installed on the piping 34 for supplying the feed water to the aforementioned tank 55 of the feed water system, the feed water having been branched off from the downstream side of the aforementioned cooler 85 installed on the piping 31 and constituting part of the recovered water extracted from the recovered water system.

In the humid air gas turbine system of the present embodiment, the water purification system 28 installed on the upstream side of the tank 55 is provided with an mixed bed ion-exchange resin capable of removing impurities ion out of water.

The following describes the operations of characteristic components in humid air gas turbine system for recovering water from exhaust gas as a thermal power plant of the third embodiment with reference to FIG. 4.

In the humid air gas turbine system as a thermal power plant of the third embodiment, part of the water recovered by the water recovery system 17 is branched off from the downstream side of the cooler 85 and is supplied to the water purification system 28 installed on the upstream side of the tank 55 through the piping 34 for supplying the same to the tank 55 of the feed water system.

The water purification system 28 eliminates the hydrogen carbonate ion formed of the carbon dioxide in the exhaust gas 13 by being absorbed into the recovered water.

As a result, the reaction of Chemical Formula (3) proceeds rightward. Since the water inside the water purification system is not in contact with the exhaust gas, there will be a reduction in the volume of free carbon dioxide in water. This reduces both the concentrations on the left and right sides of the Chemical Formula (3), with the result that the pH value of the feed water coming out of the water purification system 28 is increased while the electric conductivity is reduced.

Thus, in the tank 55 supplied with the feed water having passed throughout the water purification system 28, a command signal is outputted from the control system 100 to the chemical dosing system 50 until the pH value of the feed water measured by the pH sensor 75 installed on the tank 55 reaches 10.0, and the pH adjuster is supplied into the feed water by the chemical dosing system 50 installed in the tank 55.

In this case, the pH value of the water stored in the tank 55 has been increased by the operation of the water purification system 28 installed on the upstream side of the tank 55. Accordingly, the volume of required pH adjuster can be reduced as compared to that of the humid air gas turbine system in the first embodiment given in FIG. 1.

In the humid air gas turbine system as a thermal power plant of the third embodiment, the pH adjuster supplied from the chemical dosing system 50 is agitated inside the tank 55. This permits the pH adjuster and water to be mixed more uniformly than in other embodiments, with the advantageous result that more accurate adjustment of the pH value is ensured.

As described above, in the humid air gas turbine system as a thermal power plant of the present embodiment, a substantial reduction in the entire usage of pH adjuster is achieved by making pH adjustment in two phases, namely, by making distinction between the pH adjustment value in the recovered system and that in the feed water system. This method maintains the integrity of the metallic member of the recovered water system and ensures economical operation of the facilities at the same time.

Further, in the humid air gas turbine system as a thermal power plant of the third embodiment, the water purification system 28 is provided with a mixed bed ion-exchange resin. The similar effect can be obtained by reverse osmosis membrane (RO membrane) as well.

The reverse osmosis membrane has an advantage of eliminating the need of regeneration of the resin required for ion-exchange resin. However, the water containing concentrated impurities at the time of separation needs to be discharged at all times. This imposes a restriction of reducing the volume of recovered water that can be employed.

Further, the water purification system 28 can be provided with decarbonator. The decarbonator is a device wherein the water containing dissolved carbon dioxide is dropped on the surface of packing and others and is fed opposite to fresh air so that gas/liquid contact is caused and carbon dioxide in water is dispersed to the vapor phase side.

Even when the aforementioned decarbonator is adopted in the water purification system 28 of the humid air gas turbine system as a thermal power plant of third embodiment, all reactions of Chemical Formula (1), Chemical Formula (2) and Chemical Formula (3) proceed leftward, thereby allowing hydrogen carbonate ion in water to be discharged as carbon dioxide. Thus, impurities ion is removed from water, yielding the similar effects as those in the case where an ion-exchange resin is installed.

It should be noted that the present invention is not restricted to the humid air gas turbine system as a thermal power plant of each of the aforementioned embodiments. A great number of variations can be included.

Part of the structure of the embodiment of the humid air gas turbine system for recovering water from exhaust gas as a thermal power plant can be replaced by part of the structure of the humid air gas turbine system in another embodiment. Further, part of the structure of another embodiment can be added to, deleted from or replaced by part of the structure of the humid air gas turbine system in the aforementioned embodiment The humid air gas turbine system for recovering water from exhaust gas as a thermal power plant of the aforementioned embodiment assumes a humid air gas turbine system to show an example applied to a thermal power plant. The present invention is similarly applicable to any thermal power plant that recovers and reuses the water from the exhaust combustion gas. The similar effects of the invention can be achieved.

As will be clear from the above description, according to the present embodiment of a thermal power plant for recovering water from exhaust gas, and a method for treating a recovered water of a thermal power plant for recovering water from exhaust gas, by adjusting the circulating water having been made acid by direct gas/liquid contact with exhaust combustion gas which is flowing through the recovered water system and adjusting the feed water to be reused as water fed to the boiler which is flowing through feed water system to have the required pH level, respectively, thereby reducing the amount of the pH adjuster to be used by the entire facilities, so that the thermal power plant with improved economic efficiency can be achieved.

LIST OF REFERENCE SIGNS

1: turbine
2: compressor
3: inlet duct
4: combustor
5: shaft
6: high-pressure turbine
7: low-pressure turbine
13: exhaust gas
17: water recovery system
18: recovered water container
19: generator
22: deaerator
23: economizer
24: evaporator
25: super-heater
26: heat recovery steam generator
27: fan
28: water purification system
31, 32, 33, 34, 35, 36, 37, 41, 45, 44, 46: piping
47, 48: drum
49, 50: chemical dosing system
54: stack
55: tank
57, 58, 59, 60: valve
66: mist eliminator
71: liquid distributor
74, 75: pH sensor
85: cooler
88: packing
91, 92, 93: pump
95: fuel

The invention claimed is:

1. A thermal power plant for recovering water from exhaust gas comprising:
  a gas turbine;
  a heat recovery steam generator for generating steam by supplying exhaust combustion gas exhausted from the gas turbine as heat source;
  a water recovery system installed on the downstream side of the heat recovery steam generator for condensing and recovering water in the exhaust combustion gas through direct gas/liquid contact between the exhaust combustion gas coming down from the heat recovery steam generator and water;
  a recovered water system for supplying a part of the water recovered by the water recovery system, thereby allowing the water to be circulating as circulating water;
  a feed water system for supplying the heat recovery steam generator with other part of the water recovered by the water recovery system as feed water;
  a first pH adjusting system installed in the recovered water system to adjust the circulating water flowing through the recovered water system to a first pH value (hydrogen ion concentration index);
  a second pH adjusting system installed on the feed water system to adjust the feed water flowing through the feed water system to a second pH value (hydrogen ion concentration index); and
  a control system for controlling the volumes of the pH adjusters supplied from the first pH adjusting system and the second pH adjusting system.

2. The thermal power plant for recovering water from exhaust gas according to claim 1, wherein the first pH adjusting system and the second pH adjusting system comprise a chemical dosing system for supplying pH adjusting chemicals and a pH sensor for detecting the pH value of circulating water or feed water, respectively.

3. The thermal power plant for recovering water from exhaust gas according to claim 1, wherein the first pH value is in the range from 6.0 to 8.0, and the second pH value is in the range from 8.0 to 12.0.

4. The thermal power plant for recovering water from exhaust gas according to claim 1, wherein a water purification system for purifying the quality of feed water is provided on the feed water system at the upstream side of the second pH adjusting system for adjusting the feed water of the feed water system to a second pH value.

5. The thermal power plant for recovering water from exhaust gas according to claim 4, wherein the water purification system is provided with an ion-exchange resin.

6. The thermal power plant for recovering water from exhaust gas according to claim 4, wherein the water purification system is provided with a reverse osmosis membrane.

7. The thermal power plant for recovering water from exhaust gas according to claim 4, wherein the water purification system is provided with a decarbonator.

8. The thermal power plant for recovering water from exhaust gas according to claim 1, wherein the thermal power plant comprises a humid air gas turbine supplied with part of the steam generated by the heat recovery steam generator;
the first pH adjusting system installed on the recovered water system comprises a chemical dosing system and a pH sensor for detecting the pH value of the circulating water circulating the recovered water system; and
the second pH adjusting system installed on the feed water system comprises a chemical dosing system and a pH sensor for detecting the pH value of feed water which are respectively installed on the route of the piping leading to the drum connected to the deaerator of the heat recovery steam generator.

9. The thermal power plant for recovering water from exhaust gas according to claim 1, wherein the thermal power plant comprises a humid air gas turbine supplied with part of the steam generated by the heat recovery steam generator;
the first pH adjusting system installed on the recovered, water system comprises a chemical dosing system and a pH sensor; and
the second pH adjusting system installed on the feed water system comprises a chemical dosing system and a pH sensor which are respectively installed on the route of the piping leading from the drum connected to the deaerator of the heat recovery steam generator to an economizer.

10. The thermal power plant for recovering water from exhaust gas according to claim 1, wherein the thermal power plant comprises a humid air gas turbine supplied with part of the steam generated by the heat recovery steam generator;
the first pH adjusting system installed on the recovered water system comprises a chemical dosing system and a pH sensor;
the feed water system is provided with a tank for supplying feed water from the outside; and
the second pH adjusting system installed on the feed water system comprises a chemical dosing system and a pH sensor which are respectively installed on the tank.

11. A method for treating a recovered water of a thermal power plant for recovering water from exhaust gas, wherein the thermal power plant comprising:
a gas turbine;
a heat recovery steam generator for generating steam by supplying exhaust combustion as exhausted from the gas turbine as heat source;
a water recovery system installed on the downstream side of the heat recovery steam generator for condensing and recovering water in the exhaust combustion gas through direct gas/liquid contact between exhaust combustion gas coming down from the heat recovery steam generator and water;
a recovered water system for supplying a part of the water recovered by the water recovery system, thereby allowing the water to be circulating as circulating water;
a feed water system for supplying the heat recovery steam generator with other part of the water recovered by the water recovery system as feed water;
a first pH adjusting system installed in the recovered water system to adjust the circulating water flowing through be recovered water system to a first pH value (hydrogen ion concentration index);
a second pH adjusting system installed on the feed water system to adjust the feed water flowing through the feed water system to a second pH value (hydrogen ion concentration index); and
a control system for controlling the volumes of the pH adjusters supplied from a first pH adjusting system and the second pH adjusting system;
wherein the method for treating a recovered water of a thermal power plant for recovering water from exhaust gas comprising steps of:
controlling by the control system the volume of chemicals supplied from the first pH adjusting system to the recovered water system is adjusted, and the circulating water circulating through the recovered water system is adjusted to a first pH value; and
controlling by the control system the volume of chemicals supplied from the second pH adjusting system to the feed water system is adjusted, and the feed water flowing through the feed water system is adjusted to a second pH value.

12. The method for treating the recovered water of a thermal power plant for recovering water from exhaust gas according to claim 11 wherein the control system operates the first pH adjusting system to adjust the volume of chemicals supplied to the recovered water system, based on the deviation between the detection value of the first pH sensor for measuring the pH value of circulating water circulating through the recovered water system, and the target value; and
the control system operates the second pH adjusting system to adjust the volume of chemicals supplied to the feed water system, based on the deviation between the detection value of the second pH sensor for measuring the pH value of feed water flowing through the feed water system, and the target value.

13. The method for treating the recovered water of a thermal power plant for recovering water from exhaust gas according to claim 11, wherein the first pH value for adjusting the water circulating through the recovered water system by the first pH adjusting system is within the range from 6.0 to 8.0, and the second pH value for adjusting the feed water flowing through the feed water system by the second pH adjusting system is within the range from 8.0 to 12.0.

14. The method for treating the recovered water of a thermal power plant for recovering water from exhaust gas according to claim 11, wherein a water purification system is provided with on the upstream side of the second pH adjusting system for adjusting the feed water flowing through the feed water system to a second pH value, so that the quality of feed water flowing the feed water system through the water purification system is purified.

15. The method for treating the recovered water of a thermal power plant for recovering water from exhaust gas according to claim 11, wherein the thermal power plant is provided with a humid air gas turbine supplied with part of the steam generated by the heat recovery steam generator;

the feed water system cis provided with a tank for supplying feed water from the outside;

the first pH adjusting system installed on the recovered water system is provided with a chemical dosing system and a pH sensor, and the second pH adjusting system installed on the feed water system is provided with chemical dosing system and a pH sensor installed on the tank;

wherein the method for treating a recovered water of a thermal power plant for recovering water from exhaust gas comprising steps of:

controlling by the control system the volume of chemicals supplied from the first pH adjusting system to the recovered water system is adjusted, and the circulating water circulating through the recovered water system is adjusted to a first pH value; and controlling by the control system the volume of chemicals supplied from the second pH adjusting system to the feed water system is adjusted, and the feed water flowing through the feed water system is adjusted to a second pH value, so that the recovered water from the exhaust combustion gas is treated.

* * * * *